(12) United States Patent
Hansson et al.

(10) Patent No.: US 11,618,568 B2
(45) Date of Patent: Apr. 4, 2023

(54) INTEGRATED AIRCRAFT SEAT CONTROL PANEL

(71) Applicant: B/E Aerospace, Inc., Winston-Salem, NC (US)

(72) Inventors: Charles Martin Hansson, Winston-Salem, NC (US); John Iossifidis, Miami, FL (US); Fabian Panesso, Pembroke Pines, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 335 days.

(21) Appl. No.: 16/997,702

(22) Filed: Aug. 19, 2020

(65) Prior Publication Data

US 2022/0055751 A1 Feb. 24, 2022

(51) Int. Cl.
   *B64D 11/06* (2006.01)
   *B64D 11/00* (2006.01)

(52) U.S. Cl.
   CPC .... *B64D 11/00155* (2014.12); *B64D 11/0624* (2014.12); *B64D 11/0639* (2014.12)

(58) Field of Classification Search
   CPC .......... B64D 11/00155; B64D 11/0624; B64D 11/0639; B64D 2013/0655; B64C 2011/0053; B60N 2/797
   See application file for complete search history.

(56) References Cited

U.S. PATENT DOCUMENTS

| | | | |
|---|---|---|---|
| D402,125 S | 12/1998 | Dryburgh et al. | |
| D405,275 S | 2/1999 | Dryburgh et al. | |
| D409,010 S | 5/1999 | Papaioannou et al. | |
| D577,503 S | 9/2008 | Priestman | |

(Continued)

FOREIGN PATENT DOCUMENTS

| | | |
|---|---|---|
| CN | 302303826 S | 1/2013 |
| CN | 302785563 S | 4/2014 |

(Continued)

OTHER PUBLICATIONS

Bellingham A A et al: "Direct Integration of Individually Controlled Emissive Pixels Into Knit Fabric for Fabric-Based Dynamic Display", IEEE Photonics Journal, IEEE, USA, vol. 9, No. 4, Aug. 4, 2017 (Aug. 4, 2017), pp. 1-10, XP011658843, DOI: 10.1109/JPHOT. 2017.2722862 [retrieved on Aug. 14, 2017].
Extended Search Report for European Application No. 21191854.5 dated Jan. 4, 2022, 8 pages.

*Primary Examiner* — Joshua J Michener
*Assistant Examiner* — Ka Chun Leung
(74) *Attorney, Agent, or Firm* — Suiter Swantz pc llo

(57) ABSTRACT

An aircraft seat may include an integrated control panel at least partially embedded within an armrest of the aircraft seat. The integrated aircraft seat control panel may include at least one signal path for communicatively coupling the user interface device to at least one component of the aircraft seat. The user interface device may generate signals for at least one control function of the at least one component following an input being received. The integrated aircraft seat control panel may include a textile covering coupled to the armrest and positioned above the user interface device, the textile covering including a plurality of icons configured to indicate the location of the at least one control function on a respective portion of the user interface device. At least one icon is configured to illuminate following a receipt by at least one of a power signal or a light source output.

14 Claims, 12 Drawing Sheets

(56) References Cited

U.S. PATENT DOCUMENTS

| | | | |
|---|---|---|---|
| 7,514,641 | B2 | 4/2009 | Kohatsu et al. |
| D622,988 | S | 9/2010 | Alford |
| D645,681 | S | 9/2011 | Grell |
| D688,060 | S | 8/2013 | Sizelove |
| 8,536,075 | B2 | 9/2013 | Leonard |
| D702,070 | S | 4/2014 | Sizelove |
| D748,405 | S | 2/2016 | Sethapun et al. |
| D800,464 | S | 10/2017 | Larabie et al. |
| 10,308,177 | B2 | 6/2019 | Veca et al. |
| D868,951 | S | 12/2019 | Rejkowski et al. |
| 2006/0147678 | A1 | 7/2006 | Marmaropoulos et al. |
| 2006/0151308 | A1 | 7/2006 | Marmaropoulos et al. |
| 2006/0157334 | A1 | 7/2006 | Marmaropoulos et al. |
| 2010/0176632 | A1* | 7/2010 | Alford ............... B64D 11/0641 297/217.3 |
| 2012/0132746 | A1* | 5/2012 | Sizelove ................ A47C 7/624 345/157 |
| 2013/0313099 | A1 | 11/2013 | Komaki et al. |
| 2017/0308239 | A1* | 10/2017 | Higashihara ........... B60K 37/06 |
| 2019/0004849 | A1 | 1/2019 | Bushman et al. |
| 2019/0025953 | A1 | 1/2019 | Ma et al. |
| 2019/0303581 | A1* | 10/2019 | Quatmann ................ G06F 8/65 |
| 2020/0063297 | A1 | 2/2020 | Kabany |

FOREIGN PATENT DOCUMENTS

| | | |
|---|---|---|
| DE | 2440029 A1 | 3/1976 |
| EM | 0013401030001 S | 9/2012 |
| EM | 0022100620001 S | 4/2013 |
| EM | 0025653820018 S | 4/2015 |
| EP | 3546355 A1 | 10/2019 |
| GB | 2070694 A | 9/1981 |
| WO | 2012034111 A1 | 3/2012 |
| WO | 2019058123 A1 | 3/2019 |
| WO | WO-2019132641 A2 * | 7/2019 ............. B64D 11/00 |

* cited by examiner

INTEGRATED AIRCRAFT SEAT CONTROL PANEL

BACKGROUND

Aircraft seats in passenger compartments within an aircraft cabin are configured for one or more seating positions. In addition, the passenger compartments may include one or more passenger amenities for comfort and/or entertainment. The aircraft seats and the passenger amenities may be controlled by a passenger occupying a passenger compartment via a control panel proximate to an aircraft seat within the passenger compartment.

SUMMARY

An integrated aircraft seat control panel is disclosed, in accordance with one or more embodiments of the disclosure. The integrated aircraft seat control panel may include a user interface device at least partially embedded in a cavity defined within an armrest of an aircraft seat, the cavity being accessible via at least one exterior surface of the armrest, the user interface device including at least one user input device. The integrated aircraft seat control panel may include at least one signal path for communicatively coupling the user interface device to at least one component of the aircraft seat, the user interface device being configured to generate at least one signal for at least one control function of the at least one component following an input being received via the at least one user input device. The integrated aircraft seat control panel may include a textile covering coupled to the armrest and positioned above the user interface device, the textile covering configured to transmit the input to the at least one user input device, the textile covering including a plurality of icons configured to indicate the location of the at least one control function on a respective portion of the user interface device, at least one icon of the plurality of icons being configured to illuminate via at least one of a power signal or a light source output.

In some embodiments, wherein the plurality of icons includes luminous threading.

In some embodiments, wherein the luminous threading is charged by the light source output housed within the cavity, the light source output including one or more illumination sources.

In some embodiments, wherein the plurality of icons includes translucent material.

In some embodiments, wherein one or more light emitting diodes (LED's) are housed within the cavity and used to backlight the plurality of icons, the one or more LED's being charged by the at least one power source.

In some embodiments, wherein the plurality of icons includes conductive threading.

In some embodiments, wherein the conductive threading is charged by the light source output, the light source output including one or more illumination sources.

In some embodiments, wherein the textile covering includes a compressible material that allows the user to transmit the input to the user interface device through the textile covering.

In some embodiments, wherein the user input device is configured to respond to a user interaction, the user interaction including at least one of a user touch, press, or hold.

In some embodiments, wherein the user input device is configured to respond to a user gesture, the user gesture including at least one of a dragging, swiping, or waving motion.

In some embodiments, wherein a controller is configured to regulate the at least one power signal or light source output.

In some embodiments, wherein the user input device is communicatively coupled to the controller.

In some embodiments, wherein the at least one component of the aircraft seat includes at least one of an actuator of an aircraft seat, an illumination source of an aircraft seat, a temperature setting of an aircraft seat, or a power output source.

In some embodiments, wherein the at least one component of the aircraft seat includes at least one of an actuator of an aircraft seat, an illumination source of an aircraft cabin, a temperature setting of an aircraft cabin, or a power output source.

A passenger seating system is disclosed, in accordance with one or more embodiments of the disclosure. The passenger seating system may include an aircraft seat. The aircraft seat may include a seat frame configured to actuate between at least an upright position and a bed position. The aircraft seat may include at least one power output configured to drive an actuation of the seat frame. The aircraft seat may include a user interface device at least partially embedded in a cavity defined within an armrest of an aircraft seat, the cavity being accessible via at least one exterior surface of the armrest, the user interface device including at least one user input device. The aircraft seat may include at least one signal path for communicatively coupling the user interface device to at least one component of the aircraft seat, the user interface device being configured to generate at least one signal for at least one control function of the at least one component following an input being received via the at least one user input device. The aircraft seat may include a textile covering coupled to the armrest and positioned above the user interface device, the textile covering configured to transmit the input to the at least one user input device, the textile covering including a plurality of icons configured to indicate the location of the at least one control function on a respective portion of the user interface device, at least one icon of the plurality of icons being configured to illuminate via at least one of a power signal or a light source output. The passenger seating system may include a passenger compartment shell.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1A:
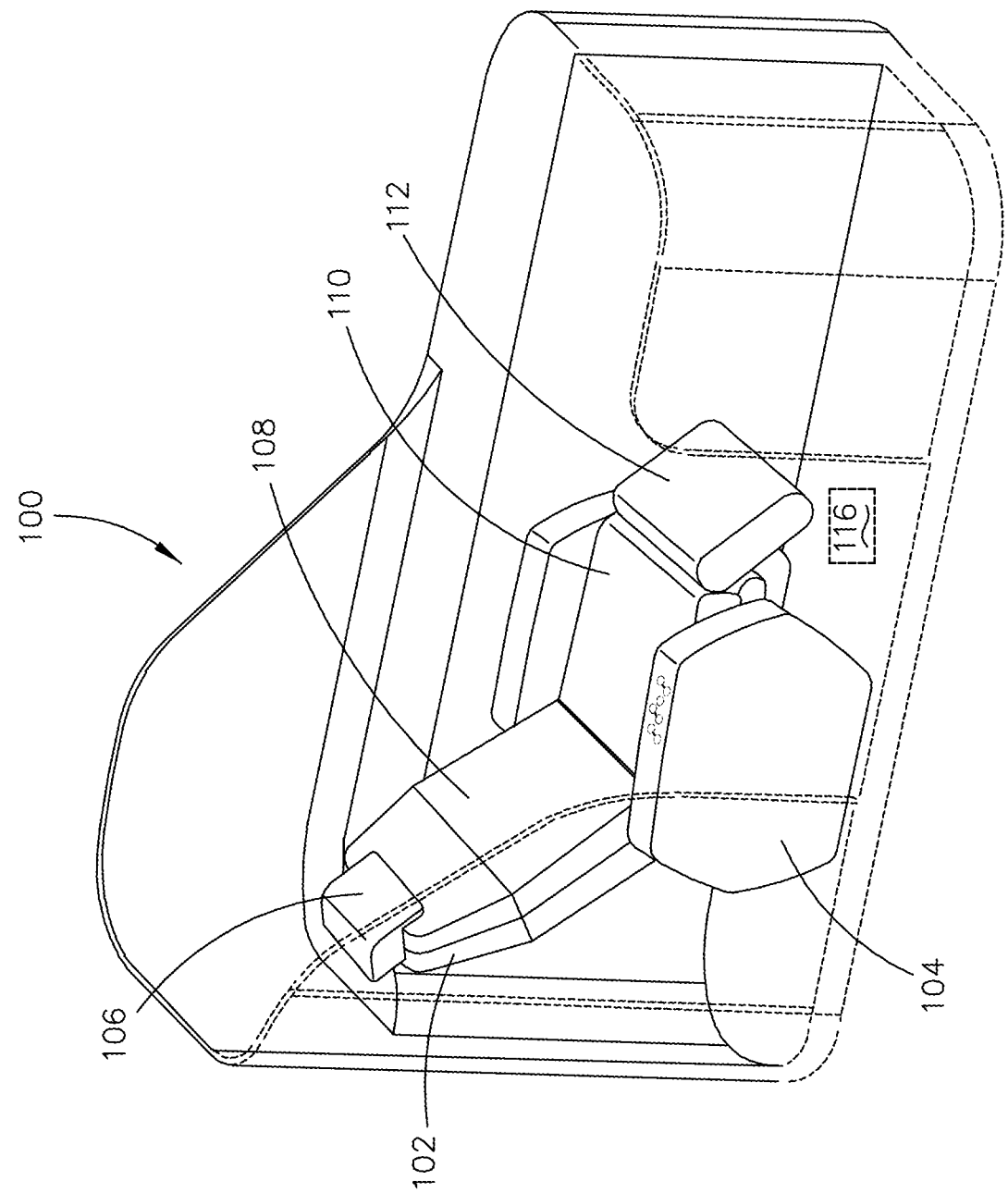
FIG. 1A illustrates a perspective view of a passenger seating system including an integrated aircraft seat control panel, in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIGS. 1A-6B, in general, illustrate an integrated aircraft seat control panel, in accordance with one or more embodiments of the disclosure.

Aircraft seats installed within an avionics environment may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

Aircraft seats in passenger compartments within an aircraft cabin are configured to allow for one or more seating positions. In addition, the passenger compartments may include one or more passenger amenities for comfort and/or entertainment. The aircraft seats and the passenger amenities may be controlled by a passenger occupying a passenger compartment via a control panel proximate to an aircraft seat within the passenger compartment.

In one example, the control panel may include extruded or otherwise offset buttons. Aircraft seats having control panels with extruded buttons may frustrate the overall aesthetic of the aircraft seat as well as hamper the cleanliness of the seat since cleaning around the buttons becomes more of a challenge.

Additionally, when an aircraft cabin becomes dark, it is often difficult for passengers to see the various icons on a control panel. This makes it difficult for passengers to access the desired seat functions. Also, when aircraft seat control panels are not integrated into the armrest, a user (e.g., a passenger or other individual with access to the aircraft seat) may have trouble accessing it, or if the control panel is integrated on the sides, it may be difficult for the user to see or reach the desired buttons.

As such, it would be beneficial to provide an integrated aircraft seat control panel. The integrated aircraft seat control panel may include one or more recessed buttons having illuminating characteristics. This will aid in providing a more aesthetically pleasing design as well as enhancing the visibility of the icons in dimly lit settings. Furthermore, a textile covering may include anti-microbial properties to help maintain a more sanitary environment. Accordingly, embodiments of the present disclosure are directed to a textile covered control panel with recessed buttons configured to allow a user to operate at least one aircraft seat function without limiting user access to controls.

In embodiments of the present disclosure, an armrest 104 includes an at least partially embedded control panel 114 with an integrated user interface device 202 for controlling various passenger accessible devices (e.g., passenger chair actuators, illumination sources, temperature control systems, power output sources, passenger light control systems, flight attendant alert/communication systems, window shade, and/or partition actuators, any combination thereof, and so forth). Various embodiments are described below with reference to FIGS. 1A through 13B.

Figure 1B:
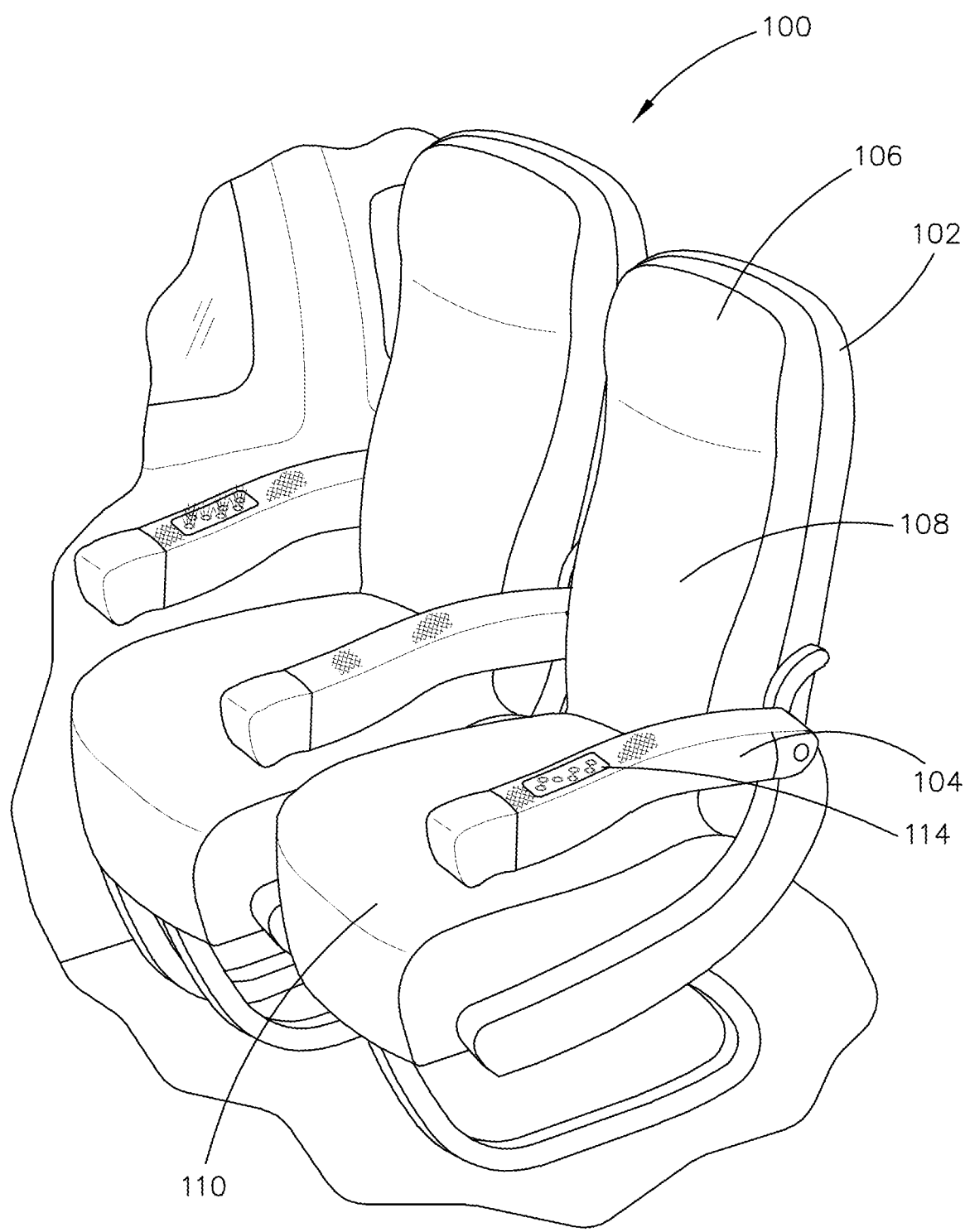
FIG. 1B illustrates a perspective view of the passenger seating system including an integrated aircraft seat control panel, in accordance with one or more embodiments of the disclosure.

FIGS. 1A-1B, in general, illustrate a passenger seating system 100 including an aircraft seat 102 with an integrated aircraft seat control panel, in accordance with one or more embodiments of the disclosure. It is noted herein the term "integrated aircraft seat control panel" and variants of the term including, but not limited to, "seat control panel," "control panel," "panel," or the like may be considered equivalent for purposes of the disclosure.

In some embodiments the passenger seating system 100 may include aircraft seats, rows, or the like, in a passenger cabin of an aircraft or any other vehicle. The aircraft seats may include a traditional economy style seat, a divan, a suite-style seat, a seat with reclinable features, a bed-style seat, a couch-style seat, or any aircraft seating style known in the art. In an example embodiment, the control panel 114 is incorporated into an aircraft seat 102 (e.g., a business-class or elite-class compartment) aboard a commercial aircraft or like seating area aboard a business jet or luxury aircraft.

The passenger seating system 100 may include a privacy shell 116. The privacy shell 116 may include an opening into the passenger seating system 100. The passenger seating system 100 may include a door for entering into the privacy shell 116. The passenger seating system 100 may also include any form of entry into the privacy shell 116 that is known in the art. The passenger seating system 100 may include an aircraft seat 102 configured to fit within a privacy shell 116. The passenger seating system 100 may also be configured to fit more than one aircraft seat within the privacy shell 116.

The aircraft seat 102 may be configured to fit within the privacy shell 116 when transitioning between positions (e.g., between an upright position and a bed position. The aircraft seat 102 may include one or more upper body support members. For example, the one or more upper body support members may include, but are not limited to, a head rest 106 and a seat back cushion 108. It is noted herein at least one of the head rest 106 or the seat back cushion 108 may be adjustable, removeable, or the like. The aircraft seat 102 may include one or more lower body support members. For example, the one or more lower body support members may include, but are not limited to, a seat pan cushion 110 and a leg rest 112.

In some embodiments, the upper body support members and the lower body support members may be separate structures disposed adjacent to one another. Alternatively, the upper body support members and the at lower body support members may have one or more shared components. For example, the upper body support members and the lower body support members may have a shared cushion or covering, one or more shared mechanical linkages, and/or one or more shared actuators. The upper body support members may be configured to move relative to the lower body support members. For example, the upper body support members may be configured to transition between upright and bed positions. In some embodiments, the lower body support members are also repositionable. For example, the lower body support members may be configured to move forward/backward, upward/downward, and/or tilt. The lower body support members and the upper body support members may be simultaneously actuated to transition from a sitting to a laying position. For example, the lower body support members may actuate forwards while the upper body support members recline to place the passenger in a bed-like configuration. In some embodiments, the aircraft seat 102 may also include one or more armrests 104 or armrest consoles adjacent to (e.g., on a left or right side) of the lower body support members.

The passenger seating system 100 may further include at least one partition for partially demarcating the aircraft seat 102 from the cabin proper (e.g., defining a private area or a communal area). In some embodiments, the passenger seating system may include a manually actuated partition or an automated partition. For example, in some embodiments, the partition may be manually actuated (e.g., raised, lowered, slid, unfolded, latched, unlatched, etc.) to open or close an entrance to the aircraft seat 102. In other embodiments, the partition may be transitioned between open and closed positions by one or more actuators (e.g., motors, linear actuators, or the like). In some embodiments, the aircraft seat 102 may include one or more control interfaces that generate signals to cause the actuators to open or close the partition based upon a user interaction (e.g., pressed button, toggled switch, swiping motion, etc.).

Figure 2:
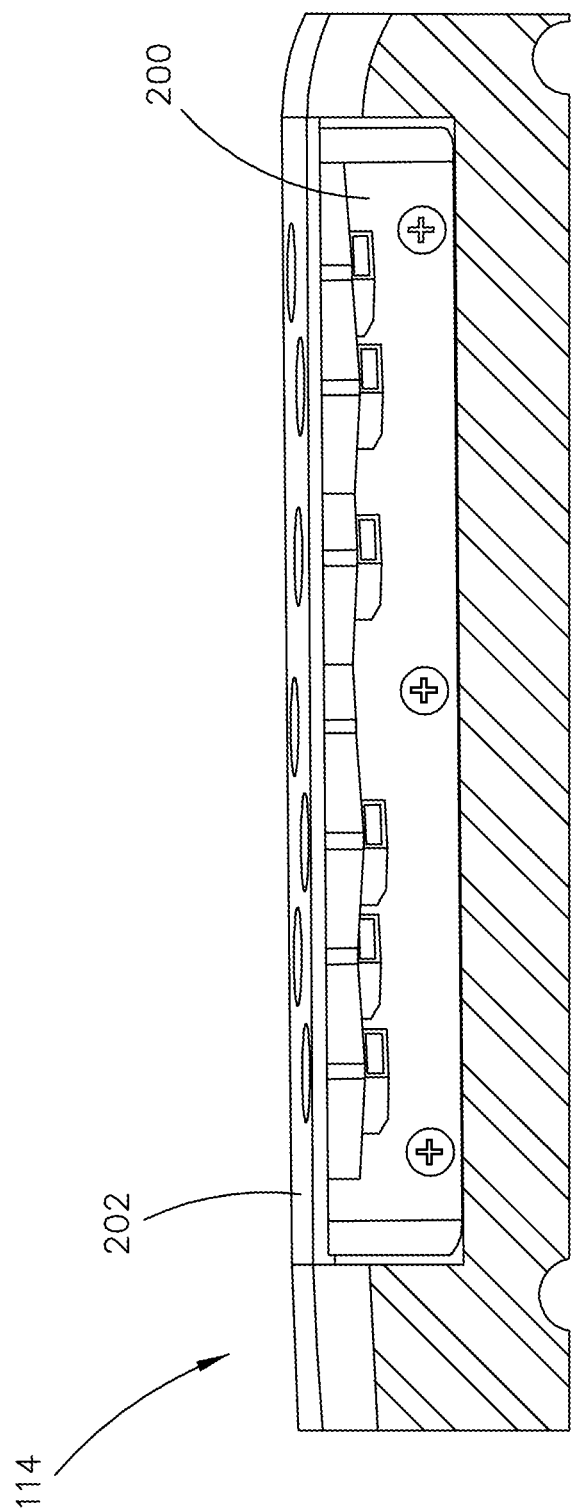
FIG. 2 illustrates a cross-sectional side view of a control panel embedded into the armrest, in accordance with one or more embodiments of the disclosure.

The aircraft seat 102 may include the armrest 104. The control panel 114 may be integrated within the armrest 104. For example, as illustrated in FIG. 2, the control panel 114 may be at least partially inserted or embedded within a cavity 200 defined within the armrest 104. The control panel 114 includes a user interface device 202 integrated (e.g., at least partially embedded) within the armrest 104. For example, as shown in FIG. 2, a cavity 200 is defined in a surface of the armrest 104, and the user interface device 202 is disposed within the cavity 200. In some embodiments, the user interface device 202 is fully disposed within the cavity 200. For example, an outer surface of the user interface device 202 may be flush with the surface of the armrest 104 or set slightly below the surface of the armrest 104.

FIGS. 3A-3G in general illustrate one or more responsive interfaces. The responsive interfaces may be configured to generate signals for controlling one or more passenger accessible devices (e.g., passenger chair actuators, illumination sources, temperature control systems, power output sources, passenger light control systems, flight attendant alert/communication systems, window shades, and/or partition actuators, any combination thereof, and so forth).

In some embodiments, the responsive interface utilized with the control panel 114 may include proximity switches, pressure-responsive switches, electrical sensors, capacitive touchpads, or any other response interface known in the art. It is noted herein the one or more responsive interfaces may be used independently or in combination with any other desired responsive interface known in the art.

Figure 3A:
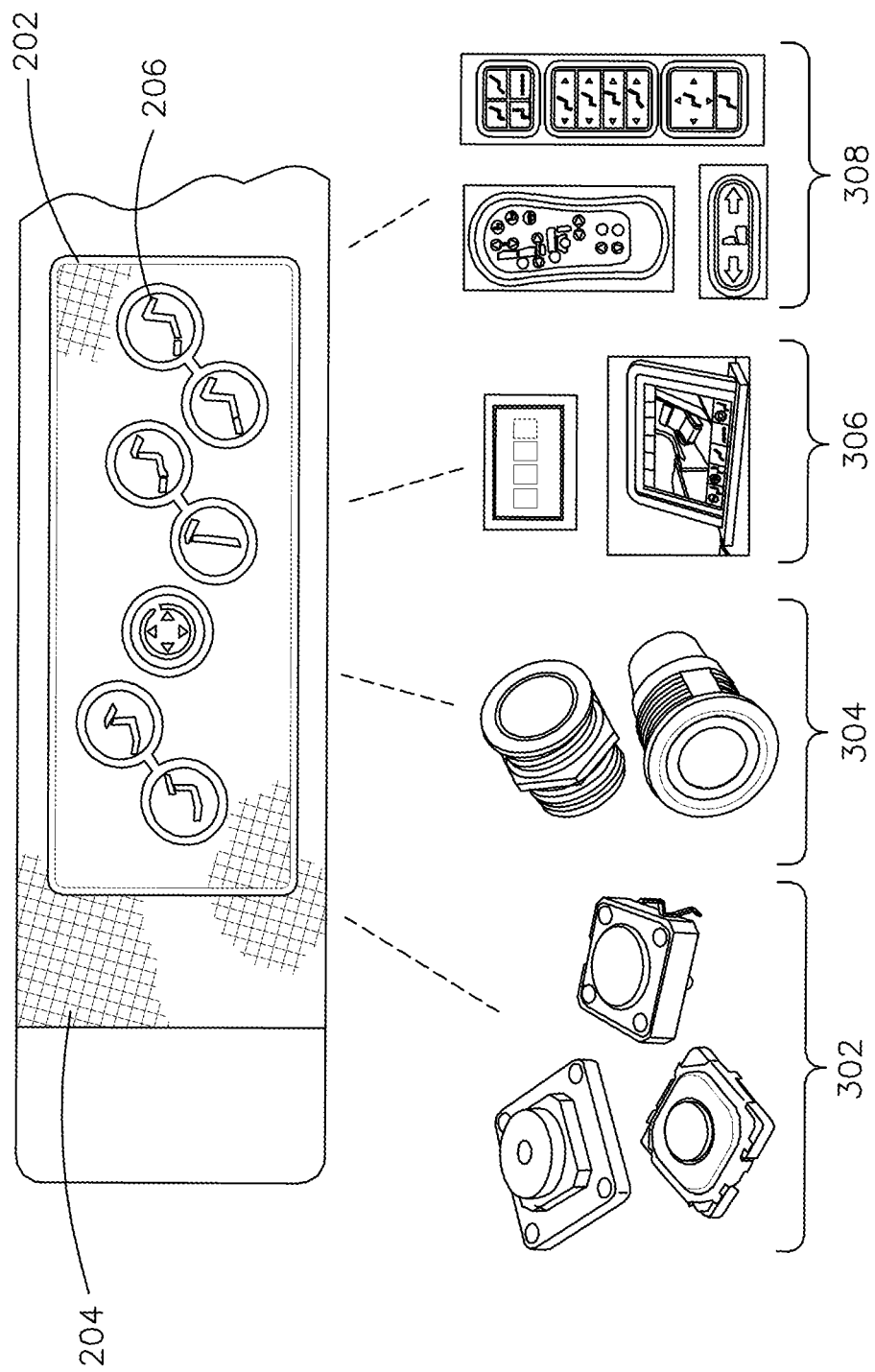
FIG. 3A illustrates an elevation view of the control panel with an integrated user interface device, in accordance with one or more embodiments of the disclosure.
Figure 3B:
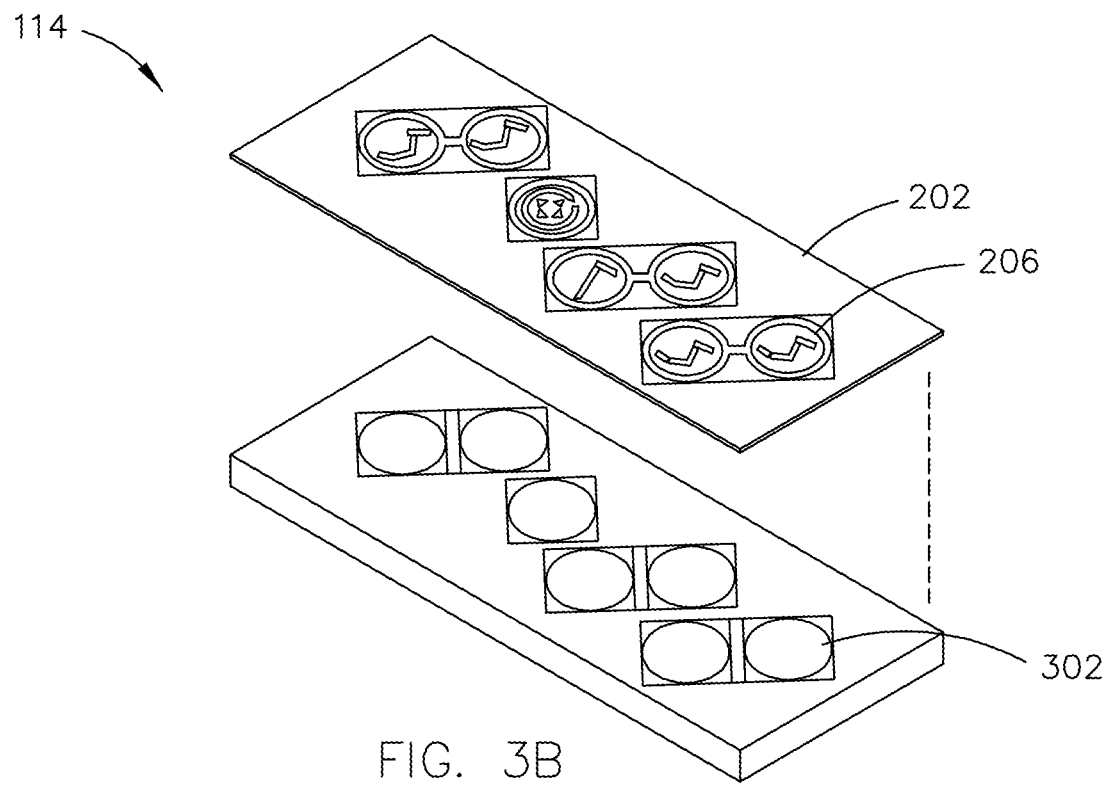
FIGS. 3B-3G illustrates an exploded view of the control panel with an integrated push buttons, in accordance with one or more embodiments of the disclosure.

FIG. 3B illustrates an example of a responsive interface including one or more push buttons 302. The one or more push buttons 302 may be configured to respond to a user touch or pressure through the textile covering 204. The one or more push buttons 302 may include toggle switches or any type of press button known in the art. The one or more push buttons may align with the plurality of icons 206 of the textile covering.

Figure 3C:
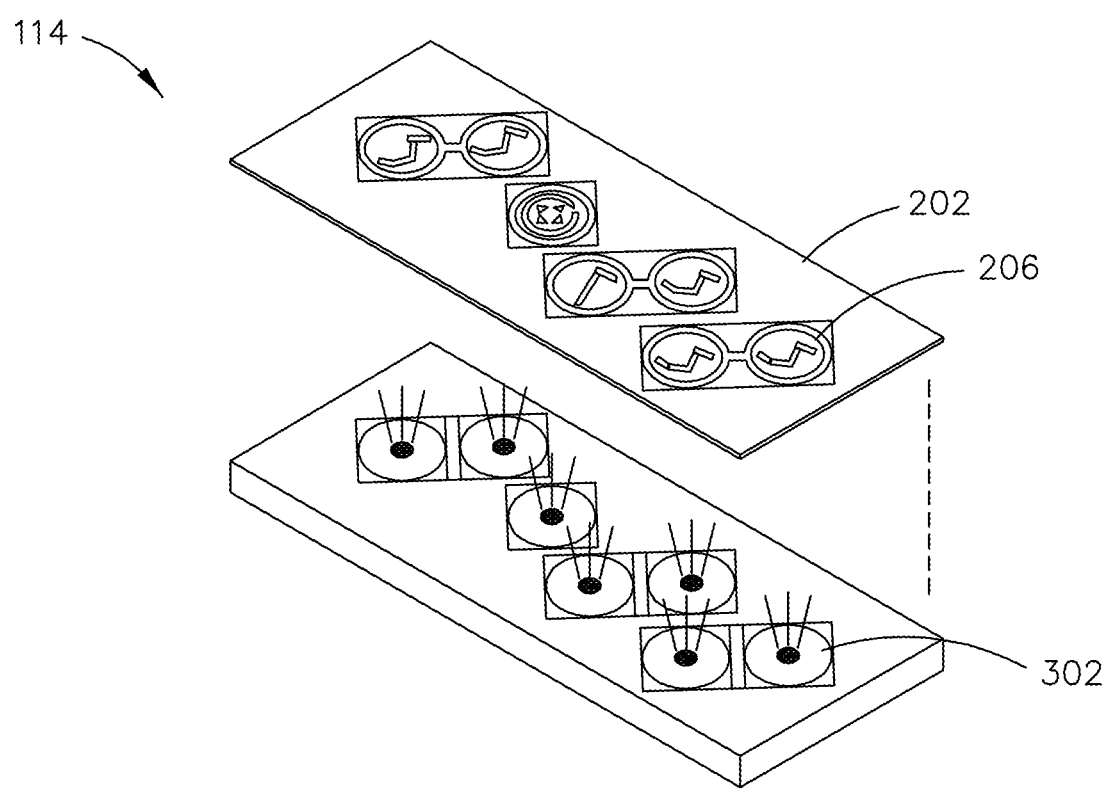

FIG. 3C illustrates an example of a responsive interface including one or more illuminated push buttons 302. The one or more illuminated push buttons 302 may include toggle switches or any type of press button known in the art. The one or more illuminated push buttons 302 may align with the plurality of icons 206 of the textile covering 204. The illumination feature that shines through the textile covering may be housed with the press button as seen in FIG. 3C.

Figure 3D:
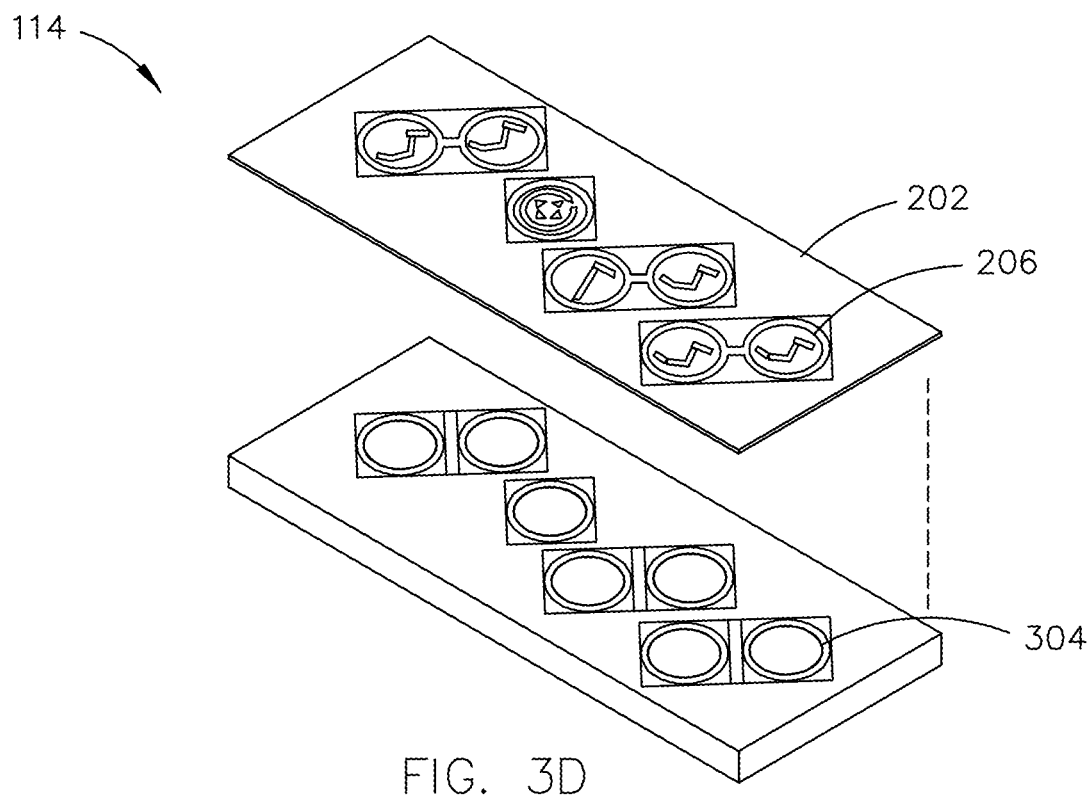
Figure 3E:
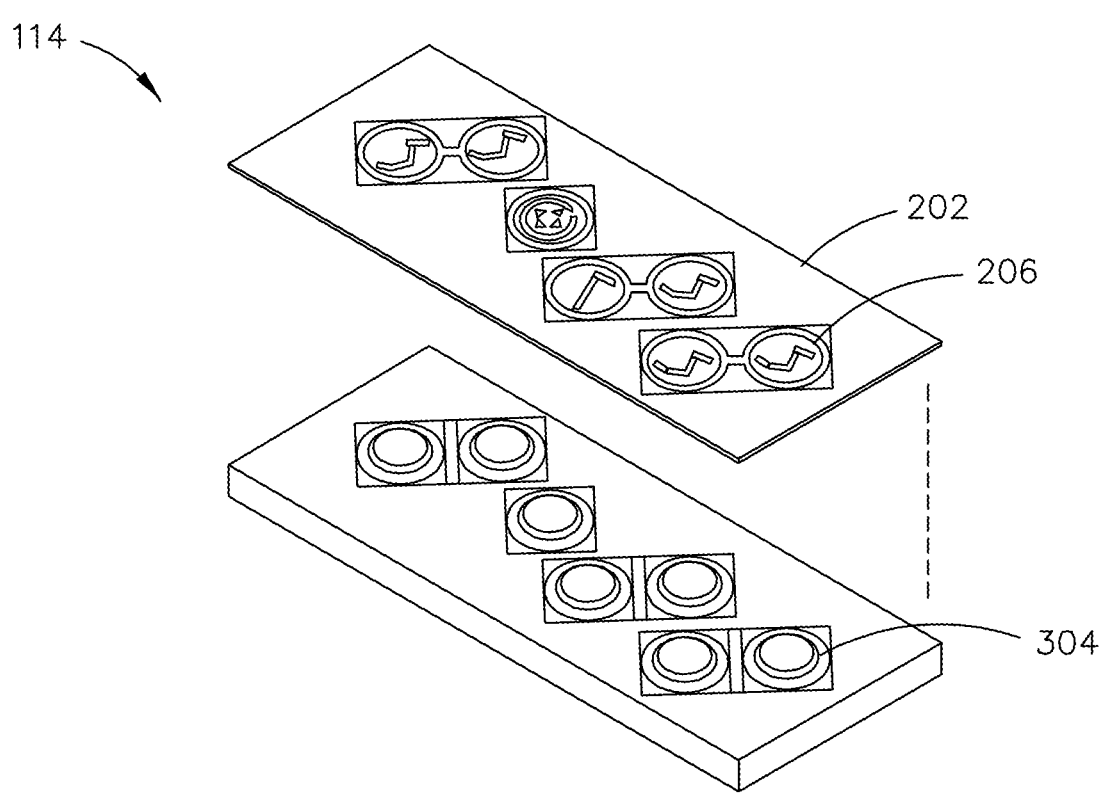

FIGS. 3D-3E illustrate an example of a responsive interface including one or more capacitive touch buttons 304. The one or more capacitive touch buttons 304 may include any type of capacitive touch button or switch known in the art. The one or more capacitive touch buttons 304 may align with the plurality of icons 206 of the textile covering 204.

Figure 3F:
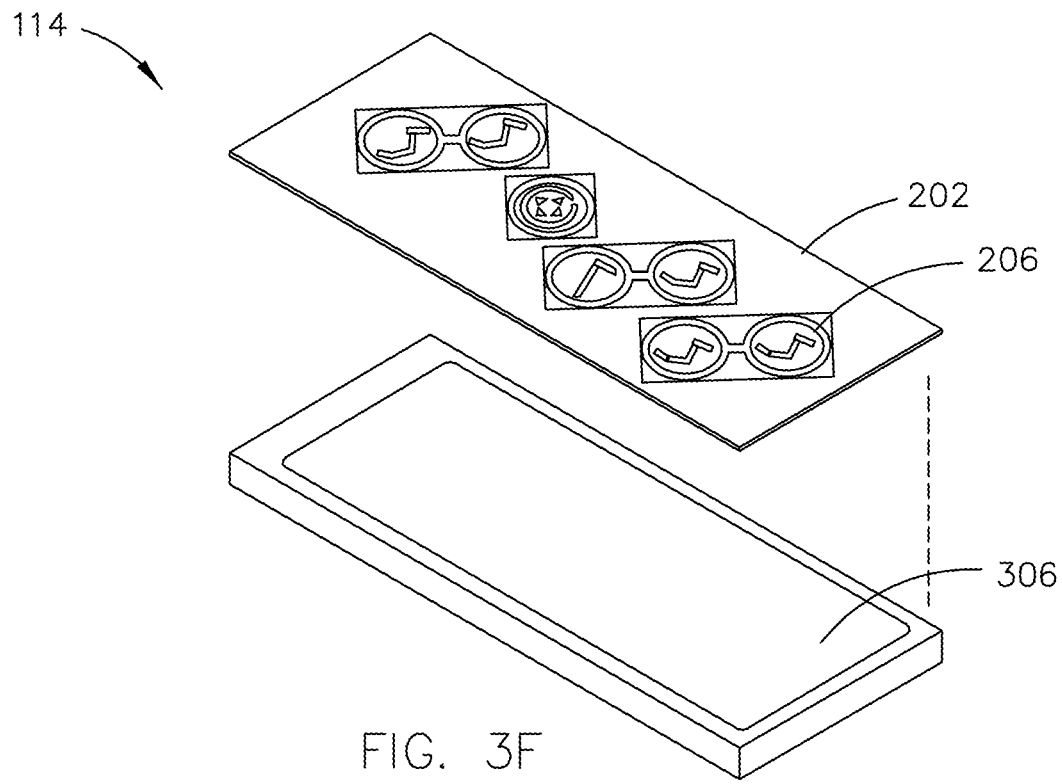

FIG. 3F illustrates an example of a responsive interface including capacitive touchscreen panels 306. The touchscreen panels 306 may include any material that is known in the art. The touchscreen panel 306 must function through the textile covering 204.

Figure 3G:
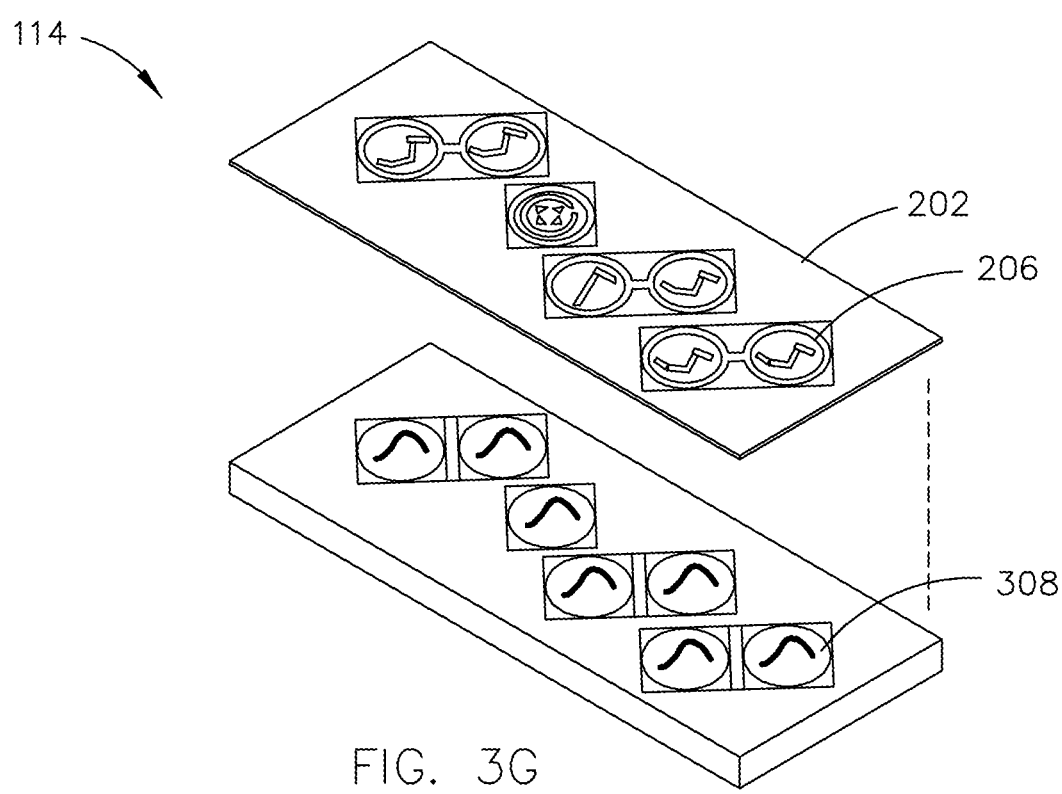

FIG. 3G illustrates an example of a responsive interface including one or more Seat Control Unit (SCU) membranes 308. The one or more SCU membranes 308 may include any type of membrane switches or sensors that are known in the art. The position of the SCU membranes 308 may align with the plurality of icons 206 of the textile covering 204.

Referring again to FIGS. 3A-3G, in some embodiments, the user interface device 202 includes a plurality of icons 206 indicating at least one control action (e.g., actuation of a passenger seat, activation of an illumination source, control of a temperature system, activation of a power output source) associated with respective portions of the responsive interface embedded beneath the plurality of icons 206. For example, in some embodiments where the responsive interface includes illuminated push buttons 302, the user interface device 202 may include the plurality of icons 206 formed over (e.g., embroidered into, painted on, stickers placed on, and the like) an outer surface of the textile covering 204 to indicate control actions associated with respective portions of the responsive interface. In other embodiments the responsive interface may include a capacitive touch interface, touchscreen panel, or SCU membrane that aligns with the desired plurality of icons 206 of the textile covering 204. In another example embodiment, the touchscreen panel 306 may be configured to display the plurality of icons 206 that indicate control actions associated with respective portions of the capacitive touchscreen.

In some embodiments, the plurality of icons 206 may light up or include illuminating characteristics. In one example embodiment, the plurality of icons 206 may include a thread that lights up in the dark (luminous thread, self-luminous thread, conductive thread and/or any other luminous thread known in the art). In another embodiment, the plurality of icons 206 may include translucent thread which may allow light to shine through. In another embodiment, the plurality icons 206 may include luminous paint or stickers that enable the plurality of icons 206 to illuminate in the dark.

In some embodiments, the cavity 200 may include embedded Light Emitting Devices (L.E.D.'s) which may shine through a translucent thread, translucent textile covering 204, and/or at least one of a plurality of pre-cut holes. In another embodiment, the cavity 200 may house at least one illumination source 610 (e.g., as illustrated in at least FIG. 6) which may shine through a translucent thread, translucent textile covering 204, and/or at least one of a plurality of pre-cut holes. The at least one illumination source 610 may charge the luminous thread, luminous paint, or luminous stickers to activate the photoluminescent properties. In some embodiments, the control panel 114 may include a power output source 614 which may charge the at least one illumination source 610, embedded L.E.D.'s, or the like.

Figure 4:
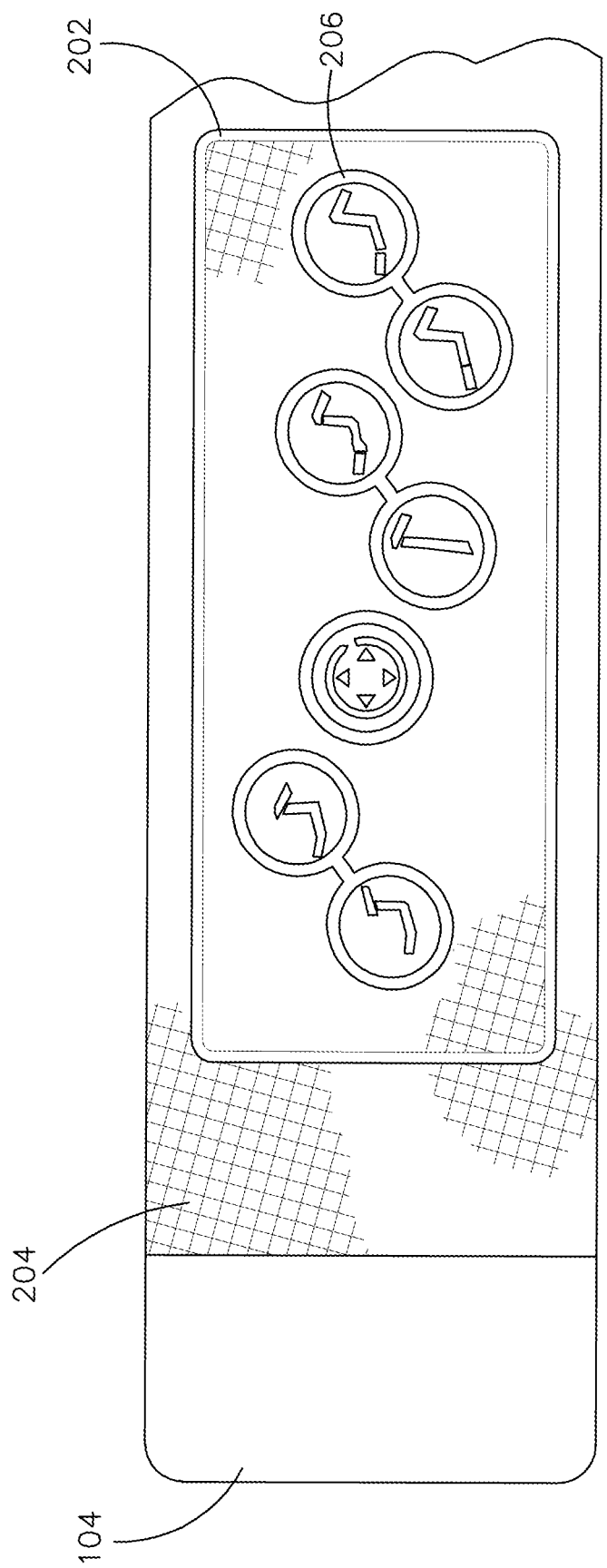
FIG. 4 illustrates a plan view of the control panel with an integrated user interface device, in accordance with one or more embodiments of the disclosure.

FIG. 4 illustrates an example of, the user interface device 202 lying beneath a textile covering 204. The textile covering 204 may be fabricated from one or more materials compatible with the responsive interface. For example, compatible materials include any material that allows for the buttons to be pressed or activated through the material covering. In some embodiments, the textile covering 204 may be sewn with temperature sensitive yarn, fabric, leather, and/or any material that allows for compression and is known in the art. For example, where the illuminated push buttons and tactile switches 302 are the chosen responsive interface, then the textile covering 204 must be made of a compressible material so that the user will be allowed to press the buttons through the textile covering 204. In some embodiments, the textile covering 204 makes up a portion (e.g., an outermost layer) of the user interface device 202. In another example embodiment, the armrest 104 has a textile covering 204 extending over the user interface device 202 and at least a portion of the surface of the armrest 104. In some embodiments, the textile covering 204 extends over the cavity 200 and the entire surface of the armrest 104 so that the user interface device 202 is seamlessly integrated within the surface of the armrest 104 and is protected from spills or any other form of moisture or debris that may potentially damage the user interface device 202.

In some embodiments, the textile covering 204 may include an anti-microbial material having photoluminescent properties as described in U.S. Patent Provisional Application No. 63/037,267, filed Jun. 20, 2020, titled "ENHANCED MAINTENANCE ANTIVIRAL COATINGS FOR CABIN SURFACES", and naming as inventor, Mark R. Gurvich which is incorporated herein by reference in its entirety.

Figure 5A:
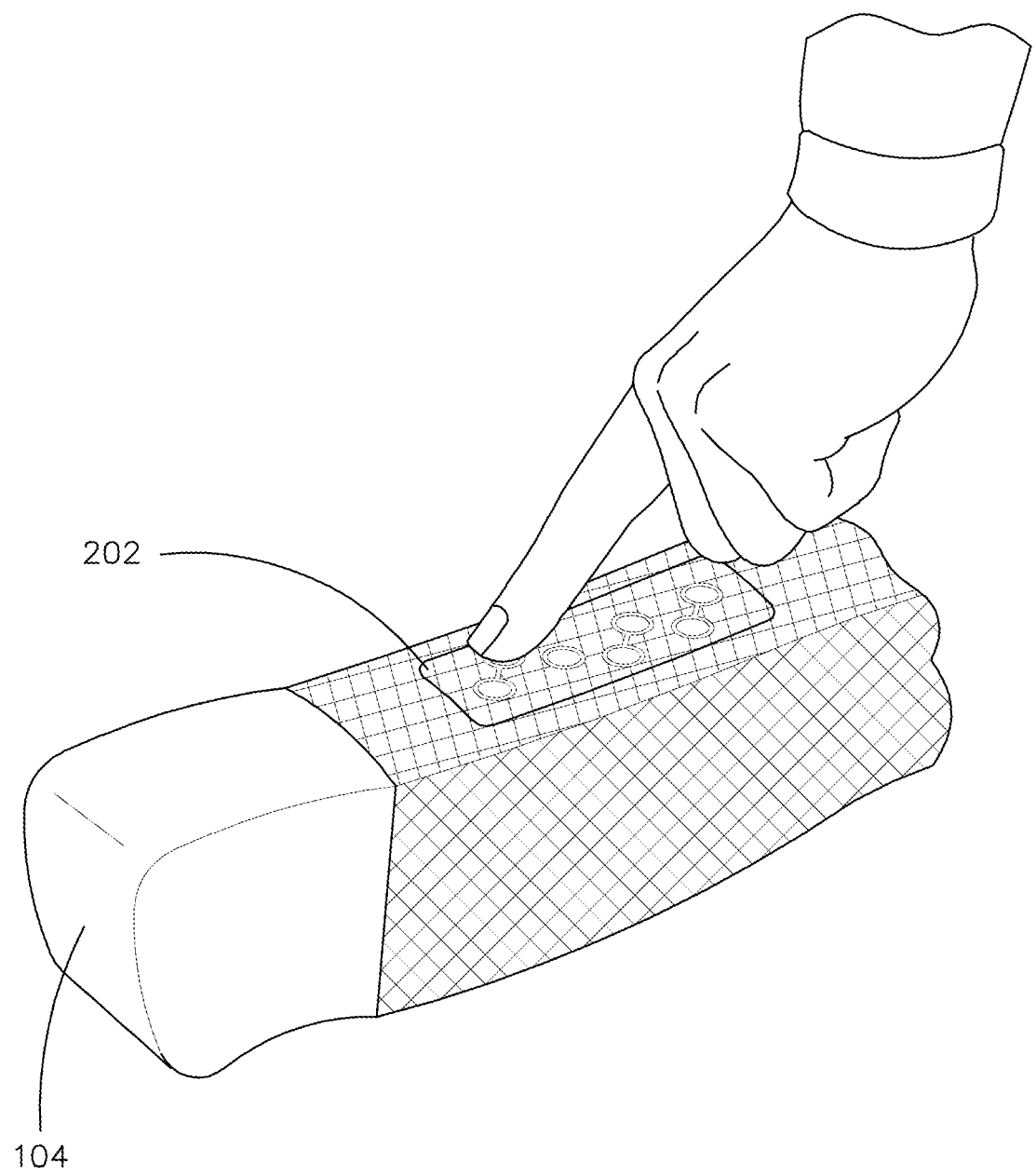
FIG. 5A illustrates an elevation view of the control panel with an integrated user interface device, in accordance with one or more embodiments of the disclosure.
Figure 5B:
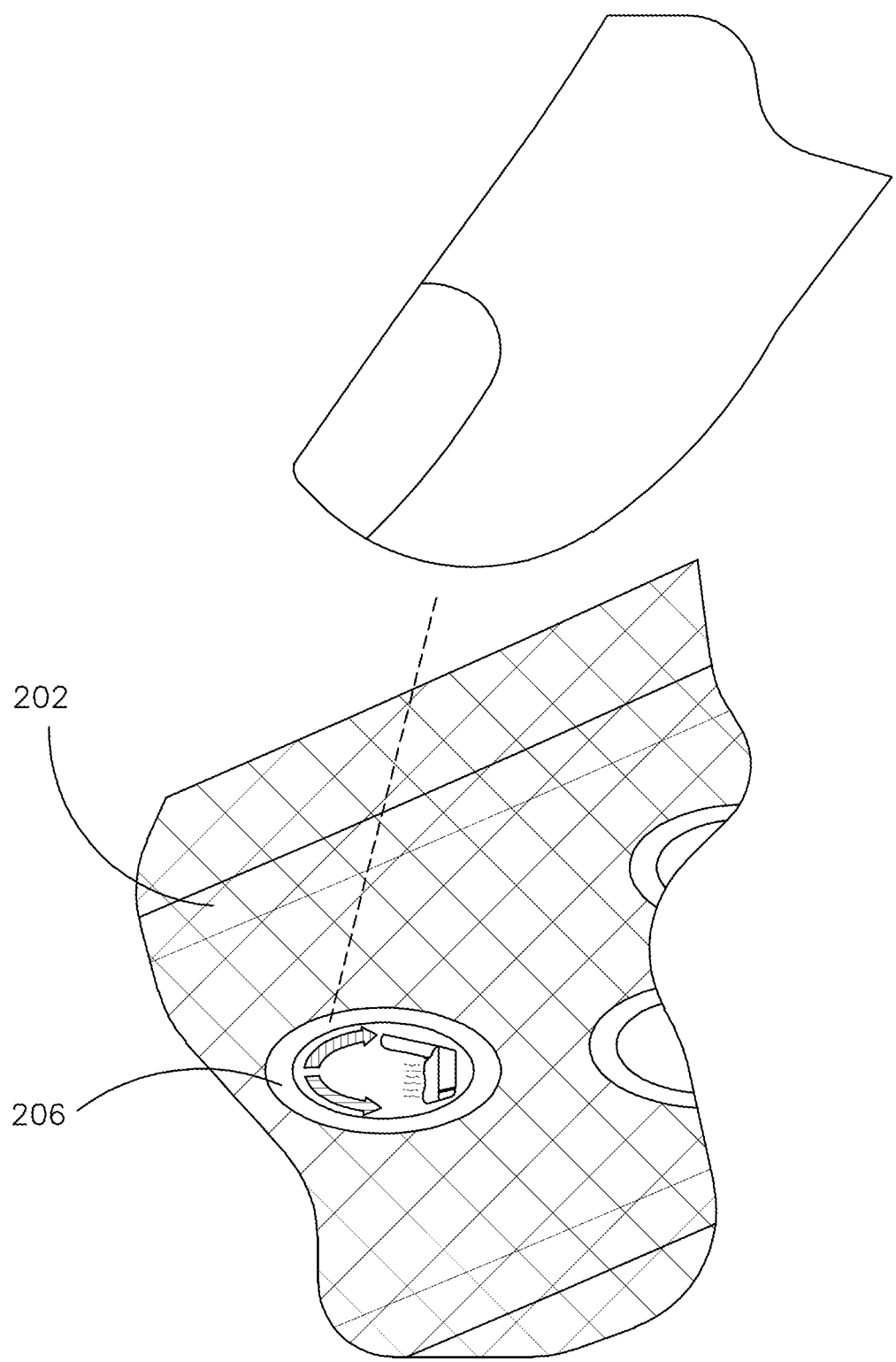
FIG. 5B illustrates a partial view of the control panel with an integrated user interface device, in accordance with one or more embodiments of the disclosure.

FIGS. 5A-5B illustrate example embodiments of user interaction with the control panel 114 (e.g., a finger tap, press, slide, drag along a path, and/or any other gesture/interaction known in the art) that trigger the responsive interface to send signals to the controller 600. One example gesture that may trigger a signal includes dragging your finger clockwise or counterclockwise around the plurality of icons 206 to activate the seat warmer, as shown in FIG. 5B.

Figure 6A:
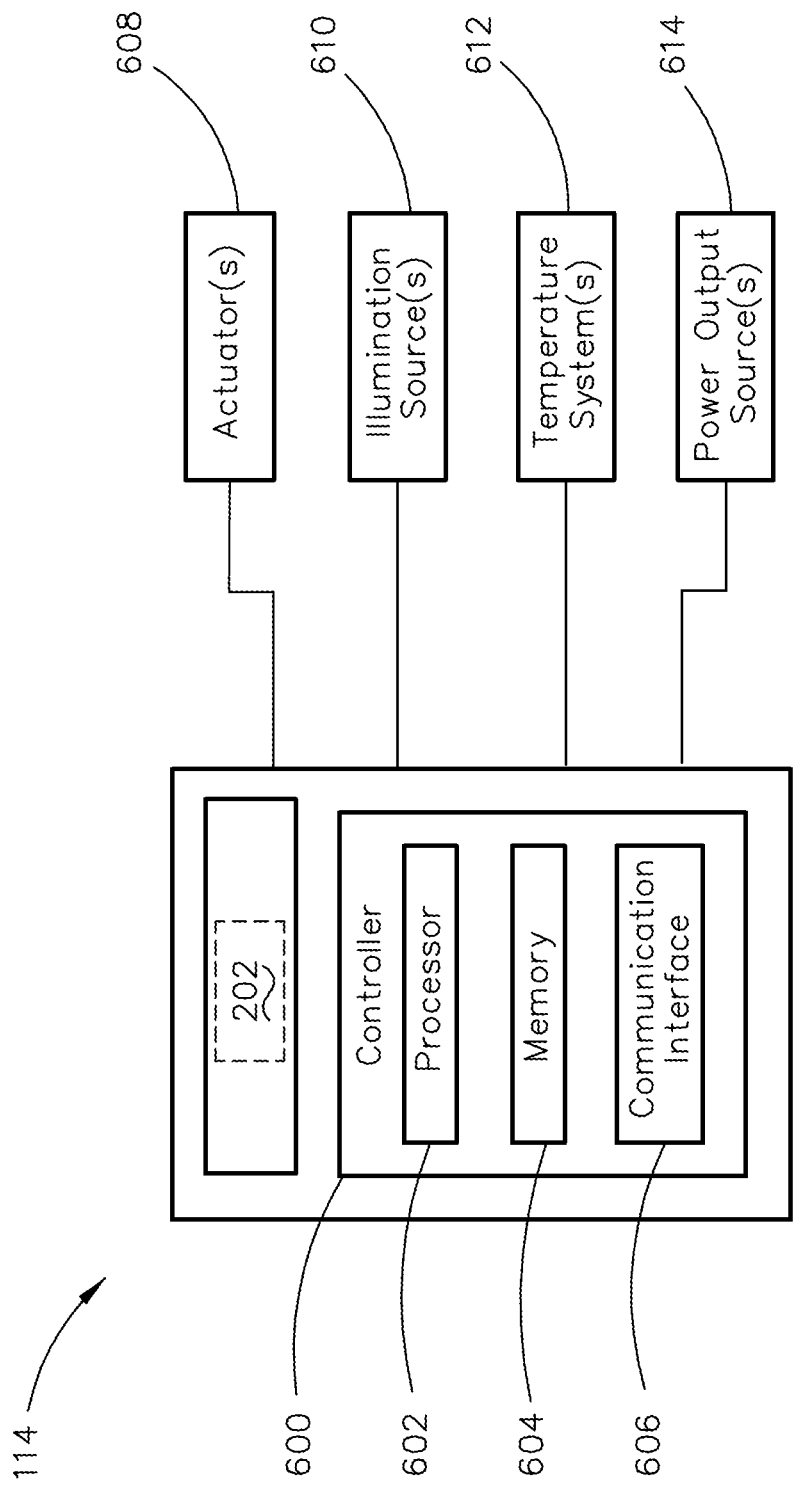
FIG. 6A is a block diagram illustrating electronic components of the control panel with an integrated user interface device, in accordance with one or more embodiments of the disclosure.
Figure 6B:
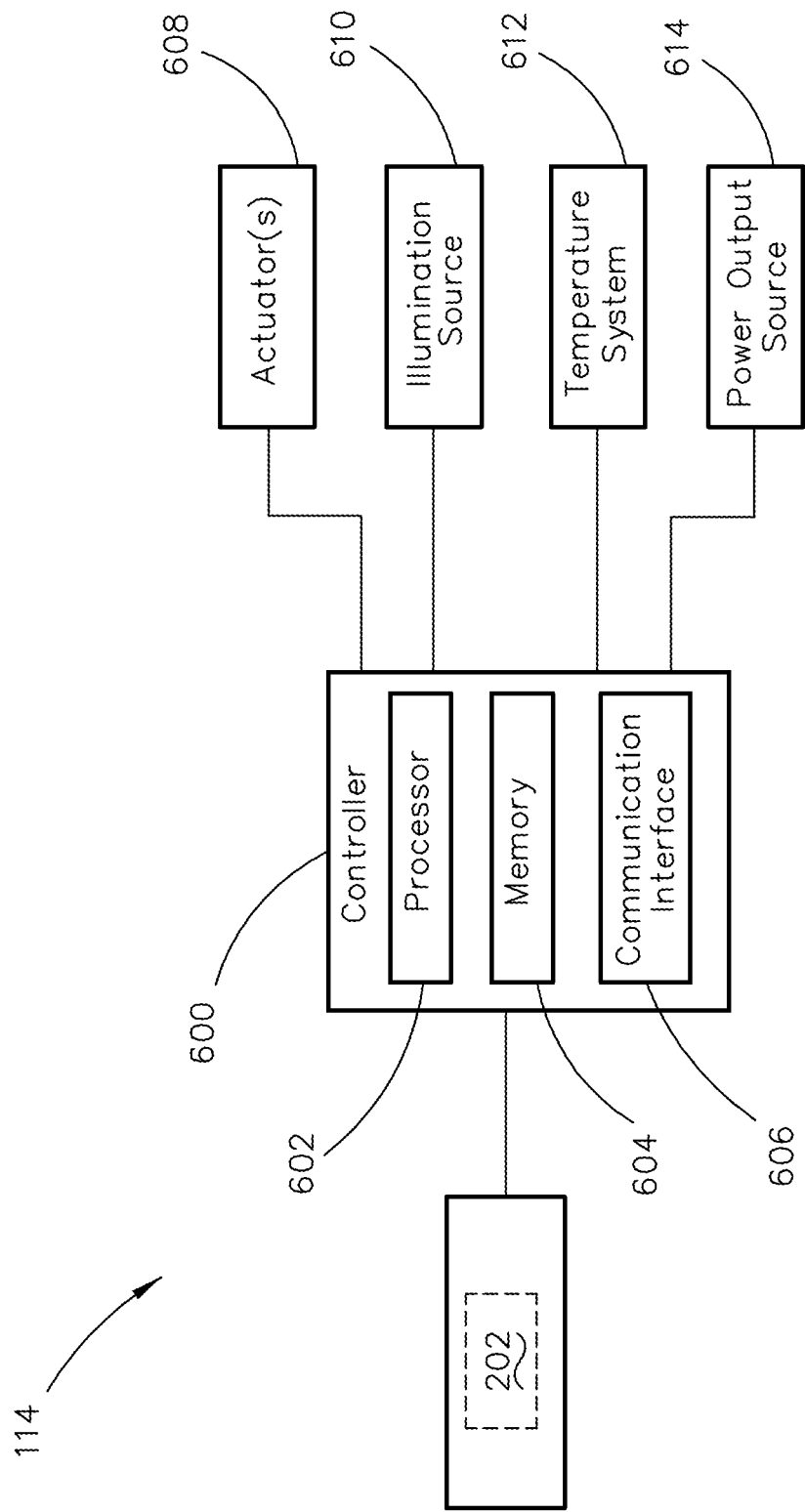
FIG. 6B illustrates a block diagram illustrating electronic components of the control panel with an integrated user interface device, in accordance with one or more embodiments of the disclosure.

FIGS. 6A-6B illustrate block diagrams of a controller 600 being communicatively coupled to the user interface device 202. In some embodiments, the control panel 114 includes the user interface device 202 having at least one responsive interface (e.g., illuminated push buttons and tactile switches 302, capacitive touch switches 304, touchscreen panels 306, and/or SCU membranes 308, or any responsive interface known in the art). The user interface device 202 may include an integrated controller 600 (e.g., as shown in FIG. 6A) or may be communicatively coupled to the controller 600 (e.g., as shown in FIG. 6B). For example, the controller 600 may be embedded in or connected to the user interface device 202, or the controller 600 may be communicatively coupled to the control panel 114 via one or more signal paths. These configurations are provided as examples; however, it is contemplated that variations on connectivity of the control panel 114 may be implemented (e.g., including, but not limited to, wireless connectivity or a mixture of wired and wireless connectivity) without departing from the scope of this disclosure. Furthermore, any number of controllers 600 may be implemented. For example, the user interface device 202 may include an integrated controller 600 or may be coupled to a respective controller 600 that communicates with another controller (e.g., for the various passenger-accessible devices).

In some embodiments, the controller 600 includes a processor 602, memory 604, and a communication interface 606. The processor 602 provides processing functionality for at least the controller 600 and may include any number of processors, micro-controllers, circuitry, field programmable gate array (FPGA) or other processing systems, and resident or external memory for storing data, executable code, and other information accessed or generated by the controller 600. The processor 602 may execute one or more software programs embodied in a non-transitory computer readable medium (e.g., memory 604) that implement techniques described herein. The processor 602 is not limited by the materials from which it is formed or the processing mechanisms employed therein and, as such, may be implemented via semiconductor(s) and/or transistors (e.g., using electronic integrated circuit (IC) components), and so forth.

The memory 604 may be an example of tangible, computer-readable storage medium that provides storage functionality to store various data and/or program code associated with operation of the controller 600/processor 602, such as software programs and/or code segments, or other data to instruct the processor 602, and possibly other components of the controller 600, to perform the functionality described herein. Thus, the memory 604 may store data, such as a program of instructions for operating the controller 600, including its components (e.g., processor 602, communication interface 606, etc.), and so forth. It should be noted that while a single memory 604 is described, a wide variety of types and combinations of memory (e.g., tangible, non-transitory memory) may be employed. The memory 604 may be integral with the processor 602, may include stand-alone memory, or may be a combination of both. Some examples of the memory 604 may include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 606 may be operatively configured to communicate with components of the controller 600. For example, the communication interface 606 may be configured to retrieve data from the processor 602 or other devices (e.g., user interface device 202, actuator(s) 608, illumination source(s) 610, temperature system(s) 612, and/or power output source(s) 614), transmit data for storage in the memory 604, retrieve data from storage in the memory 604, and so forth. The communication interface 606 may also be communicatively coupled with the processor 602 to facilitate data transfer between components of the controller 600 and the processor 602. It should be noted that while the communication interface 606 is described as a component of the controller 600, one or more components of the communication interface 606 may be implemented as external components communicatively coupled to the controller 600 via a wired and/or wireless connection. In some embodiments, the communication interface 606 may include or couple to a transmitter, receiver, transceiver, physical connection interface, or any combination thereof.

In some embodiments, the user interface device 202 is configured to generate signals for controlling one or more actuators 608 of an aircraft seat, window shade, partition, or any other automated/semi-automated passenger-accessible device, illumination sources 610, temperature systems 612, power output sources 614, and/or any other passenger-accessible device. The controller 600 may be configured to receive the signals from the user interface device 202 and generate instructions and/or control signals based on the user interface device 202 signals. The controller 600 may be further configured to transmit the instructions and/or control signals to the one or more actuators 608, illumination sources 610, temperature systems 612, power output sources 614, and/or other passenger-accessible devices. In some embodiments, the controller 600 is configured to transmit the instructions and/or control signals directly to the one or more actuators 608, illumination sources 610, temperature systems 612, power output sources 614, and/or other passenger-accessible devices. In other embodiments, the controller 600 is configured to transmit the instructions and/or control signals to at least one other controller or control system that is configured to control the one or more actuators 608, illumination sources 610, temperature systems 612, power output sources 614, and/or other passenger-accessible device.

In some embodiments, the controller 600 may be further configured to receive information from the one or more passenger-accessible devices. For example, the controller 600 may receive information regarding a display or audio content output (e.g., movie, TV show, flight information, game, safety alert, etc.). In some embodiments, the controller 600 may be configured to at least partially disable the user interface device 202 when safety alerts or other alerts that are directed at all passengers are broadcast or provided. In embodiments where the responsive interface is a touchscreen panel 306, the controller 600 may be configured to modify the plurality of icons 206 based on the content being output. In some embodiments, the controller 600 may also be configured to provide visual feedback through the touchscreen panel 306 (e.g., to indicate volume, track bar display, lights on/off, actuator positions, etc.) based upon user inputs to the user interface device 202 and/or information received from the one or more passenger-accessible devices being controlled.

As such, it would be beneficial to provide an integrated aircraft seat control panel. The integrated aircraft seat control panel including one or more recessed buttons having illuminating characteristics. This will aid in providing a more aesthetically pleasing design as well as enhancing the visibility of the plurality of icons 206 in dimly lit settings. Furthermore, a textile covering 204 may include anti-microbial properties to help maintain a more sanitary environment. Accordingly, embodiments of the present disclosure are directed to an integrated aircraft seat control panel with recessed buttons configured to allow a user to operate at least one aircraft seat function without limiting user access to controls.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An integrated aircraft seat control panel, comprising:
a user interface device fully embedded in a cavity defined within an armrest of an aircraft seat, the cavity being accessible via at least one exterior surface of the armrest, the user interface device including at least one user input device positioned flush with or recessed relative to the at least one exterior surface;
at least one signal path for communicatively coupling the user interface device to at least one component of the aircraft seat, the user interface device being configured to generate at least one signal for at least one control function of the at least one component following an input being received via the at least one user input device; and
a textile covering coupled to the armrest and positioned above the user interface device, the textile covering continuous across the user interface device and portions of the armrest adjacent the user interface device, the textile covering configured to transmit the input to the at least one user input device, the textile covering comprising a plurality of icons configured to indicate the location of the at least one control function on a respective portion of the user interface device, and the plurality of icons including threading provided in the textile covering configured to be illuminated via at least one of a power signal and a light source output of the user interface device.

2. The integrated aircraft seat control panel of claim 1, wherein the threading is luminous threading.

3. The integrated aircraft seat control panel of claim 2, wherein the luminous threading is charged by the light source output, the light source output comprising one or more illumination sources.

4. The integrated aircraft seat control panel of claim 1, wherein the threading is conductive threading.

5. The integrated aircraft seat control panel of claim 4, wherein the conductive threading is charged by the light source output, the light source output comprising one or more illumination sources.

6. The integrated aircraft seat control panel of claim 1, further comprising: a controller, wherein the controller is configured to regulate the at least one power signal or light source output.

7. The integrated aircraft seat control panel of claim 6, wherein the at least one user input device is communicatively coupled to the controller.

8. The integrated aircraft seat control panel of claim 7, wherein the at least one component of the aircraft seat includes at least one of an actuator of the aircraft seat, an illumination source of the aircraft seat, a temperature setting of the aircraft seat, or a power output source.

9. The integrated aircraft seat control panel of claim 7, wherein the at least one component of the aircraft seat includes at least one of an actuator of the aircraft seat, an illumination source of an aircraft cabin, a temperature setting of an aircraft cabin, or a power output source.

10. The integrated aircraft seat control panel of claim 1, wherein the plurality of icons includes translucent material.

11. The integrated aircraft seat control panel of claim 1, wherein the textile covering comprises a compressible material that allows the user to transmit the input to the user interface device through the textile covering.

12. The integrated aircraft seat control panel of claim 1, wherein the at least one user input device is configured to respond to a user interaction, the user interaction including at least one of a user touch, press, or hold.

13. The integrated aircraft seat control panel of claim 1, wherein the at least one user input device is configured to respond to a user gesture, the user gesture including at least one of a dragging, swiping, or waving motion.

14. A passenger seating system comprising:
an aircraft seat, the aircraft seat comprising:
a seat frame configured to actuate between at least an upright position and a bed position;
at least one power output configured to drive an actuation of the seat frame;
a user interface device fully embedded in a cavity defined within an armrest of the aircraft seat, the cavity being accessible via at least one exterior surface of the armrest, the user interface device including at least one user input device positioned flush with or recessed relative to the at least one exterior surface of the armrest;
at least one signal path for communicatively coupling the user interface device to at least one component of the aircraft seat, the user interface device being configured to generate at least one signal for at least one control function of the at least one component following an input being received via the at least one user input device; and
a textile covering coupled to the armrest and positioned above the user interface device, the textile covering continuous across the user interface device and portions of the armrest adjacent the user interface device, the textile covering configured to transmit the input to the at least one user input device, the textile covering comprising a plurality of icons configured to indicate the location of the at least one control function on a respective portion of the user interface device, and the plurality of icons including threading provided in the textile covering configured to be illuminated via at least one of a power signal and a light source output of the user interface device; and
a passenger compartment shell.

* * * * *